May 23, 1933.  N. T. HARRINGTON  1,910,917
PISTON RING
Filed May 28, 1932
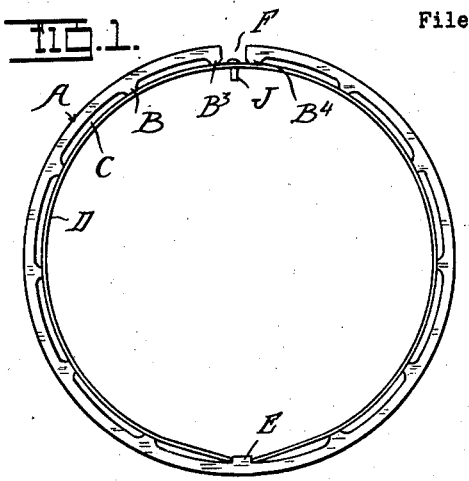
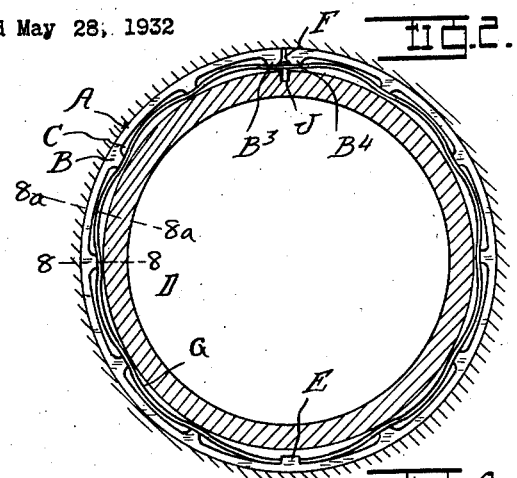
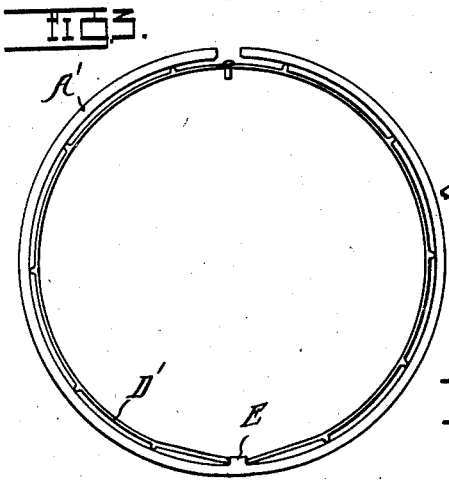
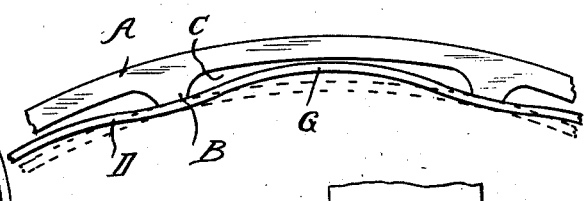
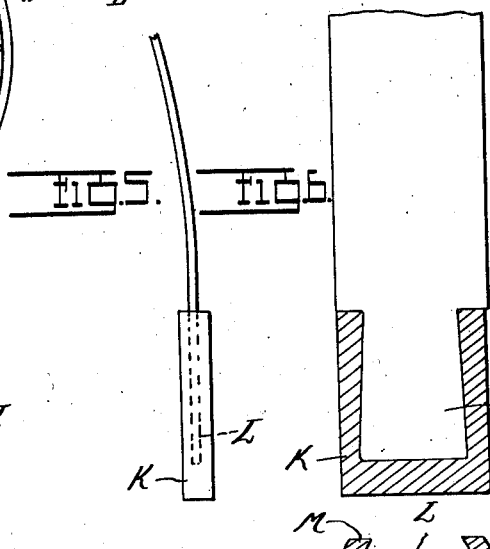
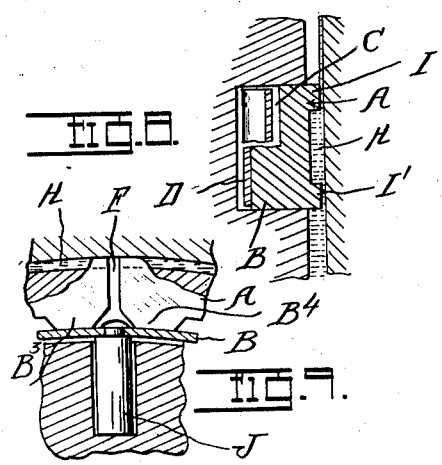
Inventor
Norman T. Harrington
By Whittemore Hulbert
Whittemore & Belknap
Attorneys Patented May 23, 1933

1,910,917

UNITED STATES PATENT OFFICE

NORMAN T. HARRINGTON, OF CLEVELAND, OHIO

PISTON RING

Application filed May 28, 1932. Serial No. 614,248.

The invention relates to piston rings of the type sometimes called oil rings, the essential function of which is to limit the consumption of oil, while at the same time maintaining adequate lubrication on the cylinder wall. To perform this function satisfactorily under variable conditions the ring must possess a number of characteristics, as follows:

First, it must be sufficiently flexible to conform to irregularities in the cylinder wall;

Second, it must maintain a predetermined unit pressure on the oil film between the periphery of the ring and the cylinder wall to reduce the thickness of said film to the desired limit;

Third, there must be an ample supply of lubricant adjacent to the portion of the periphery of the ring which is pressed against the oil film;

Fourth, the ring must be capable of quickly expanding and contracting to compensate for differences in diameter at the upper and lower ends of the cylinder due to temperature differences, this action being commonly known as breathing;

Fifth, during this breathing action the predetermined unit pressure on the oil film must be maintained as otherwise the thickness of the film will be altered.

One type of oil ring which has been extensively used is a ring limited in radial thickness to impart the required flexibility supplemented by an expander such as a corrugated ribbon expander for developing the required outward pressure against the oil film. With such rings it is usual to form the expander of a corrugated ribbon, the inner crests of the corrugations bearing against the bottom of the ring groove and the outer crests bearing against the ring. Thus the radial pressure is determined by the extent to which these corrugations are flattened down when the ring is in engagement with the cylinder. Also, the pressure of the crests against the ring at spaced points therearound tends to conform the ring to the cylinder, when the latter is of non-circular form. However, as ring grooves in pistons are not of standard depth, any variation in depth will alter the tension of the expander and consequently the pressure which it will exert against the cylinder wall. It is therefore necessary to provide a series of expanders for alternative use with each size of ring from which proper selection may be made, depending upon the depth of the ring groove.

It is the object of the present invention to obtain a construction of ring and expander which conforms to the necessary conditions as above described, but which is independent of the depth of the ring groove, so that the same construction of expander may be used with the ring for all depths of grooves. It is a further object to obtain certain advantages over constructions heretofore used as will be more fully hereinafter described.

In the drawing:

Figure 1 is an elevation of the ring and expander in assembled relation but before the ring has been contracted to enter the cylinder;

Figure 2 is a similar view with the ring in engagement with the cylinder and the expander under tension;

Figure 3 is a view similar to Figure 1 showing a modified construction;

Figure 4 is an enlarged view of a portion of the ring showing in full and dotted lines the position of the expander respectively before and after contraction of the ring to fit the cylinder;

Figures 5, 6 and 7 are enlarged views respectively of an edge elevation, side elevation and cross section showing a modified construction of expander;

Figure 8 is an enlarged cross section through the ring partly on line 8—8 and partly on line 8a—8a of Figure 2;

Figure 9 is an enlarged view showing the manner of securing the anchoring pin to the expander and its relation to the ring.

For use with pistons of internal combustion engines, rings and expanders must be trans-split to permit of slipping over the piston into engagement with the ring groove. This trans-splitting of the ring also permits of expansion and contraction while the ring is functioning by the movement of the ends on opposite sides of the split towards or from each other. The same is true with the expander, the ends of which move towards or from each other during radial contraction or expansion. With my improved construction of expander, the ends are held in fixed relation to each other when functioning in the engine cylinder, the only purpose of splitting the ring being to permit engagement with the piston groove. With the ends of the expander thus held in fixed relation, its reaction during expansion and contraction of the ring is very different from a construction where the ends are free to move. Thus with the latter the radial pressure is developed through the corrugations in the expander, the inner crests of which bear against the bottom of the ring groove and the outer crests against the inner surface of the ring, so that during contraction of the ring these corrugations are flattened and during expansion of the ring increase in radial depth. On the other hand with my improved construction the radial contraction of the ring has the effect of increasing the radial depth of the corrugations whereas during the expansion of the ring, the expander approaches a true circular form. This dispenses with the necessity of any contact between the expander and the bottom of the ring groove, the reaction being entirely confined to the expander and ring.

As illustrated in Figure 1, the ring A is restricted in radial thickness to impart a high degree of flexibility thereto, but is provided around its inner periphery with a series of inwardly projecting lugs or bearings B with intermediate pockets C. The expander D is formed of a thin ribbon which when first engaged with the ring A is approximately of true circular form bearing only against the inwardly projecting lugs B. To relatively fix the ends of the expander they are, as shown in Figure 1, engaged with the opposite side of a lug E, projecting inward from the ring and this lug is preferably arranged diametrically opposite the split F in the ring. Thus as shown in Figure 1, the engagement of the expander with the ring and with the lugs E thereof will spread the ends of the ring apart at the splits F so that the diameter of the ring is greater than that of the cylinder. When, however, the ring is contracted and forced into the cylinder the expander D is incapable of altering the length of its perimeter so that it will be bowed outward between the lugs B and into the spaces provided by the pockets C. This will place the expander under tension which develops the desired outward pressure of the ring against the cylinder wall, while at the same time permitting freedom for the ring to float in the ring groove. Within certain limits the greater the number of points of bearing of the ring against the expander the higher the tension which will be developed in the expander and also the more perfect the conformity of the periphery of the ring to the shape of the cylinder wall. Also as the expander reduces the depth of its corrugations or bowed portions G during radial enlargement of the ring, these bowed portions will produce an effect similar to toggle levers to maintain the outward pressure on the ring more nearly constant.

While I preferably employ the construction illustrated in Figures 1 and 2 where the radially extending bearing portions B are formed integral with the ring A, the effect would be the same if they were made a part of the expander. Such a construction is illustrated in Figure 3 where the ring A' is of a constant radial depth throughout its extent with the exception of the lug E and the expander D' is provided with spaced outwardly projecting bearing portions B'. The operation would be the same with such construction but the difficulty in manufacturing the expander will be greatly increased. On the other hand, with the construction shown in Figures 1 and 2, the lugs B and pockets C may if desired be formed during the original casting of the ring, requiring no machining operation other than possibly facing off the inner ends of said lugs.

The outward expansion of the ring may be accomplished either entirely through the operation of the expander or partly by the expander and partly by the inherent tension in the ring. I prefer, however, to use only the expander pressure, the ring being formed originally of approximately the size of the cylinder so that there will be no inherent tendency for it to expand. This has the advantage that it avoids any distortion in the peripheral surface of the ring due to the varying radial depth at the lugs B and in the portions intermediate said lugs. Also the tension which may be developed by the expander is all that is required without assistance from the ring.

To limit the total outward pressure of the expander while maintaining the desired unit pressure, the area of contact in the periphery of the ring is reduced. This I accomplish by forming a groove H in the periphery of the ring intermediate the bearing portions I and I' at the top and bottom thereof. This groove performs the further function of an oil reservoir in which a supply of lubricant is maintained to constantly wipe over the cylinder wall, while the portions I and I' will squeeze the intervening oil filament down to the required thickness.

It is desirable to hold the ring from rotation in the ring groove so that after the ring has once conformed to the cross-sectional surface of the cylinder it will not change its position. This may be accomplished by placing a pin J in the expander, preferably at a point diametrically opposite from the ends of the expander and adjacent to the split in the ring. This pin may be engaged with a socket in the bottom of the ring groove which will hold the expander from rotation and this in turn by engagement with the lug E will hold the ring from rotation. As shown in Figure 9, the pin J may be attached to the expander by forming a reduced shank J' passing through an aperture in the expander and riveted over to form a retaining head. This rivet head will register with the split in the ring and to provide full clearance for the head the ends of the ring are beveled off or cut away on their inner sides as indicated at B².

As shown in Figures 5, 6 and 7, the ends of the expander may be enlarged to form a better bearing. As specifically illustrated, this is accomplished by securing blocks K to the ends of the expander, these blocks being provided with a groove or recess to receive a tongue L at the end of the expander and having flanges M upon opposite sides of said recess which may be bent over to prevent disengagement. This enlarged bearing will preclude the abrading or cutting of the lug E by the expander ends. Also, if so desired, the lugs E may be dispensed with and the blocks K abutted against each other. However, I believe the more practical way is to engage the ends of the expander with the lugs E rather than abutting these ends against each other, and this also serves to hold the ring and expander from any relative rotary movement.

A weak point in the construction of all trans-split piston rings is in the ends of the ring adjacent to the split. These do not press against the cylinder wall with as high a pressure as the other portions of the ring which may result in leakage at this point. With my construction I arrange inwardly projecting lugs B³, B⁴ immediately adjacent to the opposite ends of the ring, which lugs bear against the center portion of the expander. During the tensioning of the expander and the contraction of the ring there is a sliding movement over the lugs B and by reason of the frictional resistance the deepest corrugations in the expander will be those adjacent the lugs B³, B⁴. Thus a slightly higher pressure will be developed at this point which will compensate for the inherent weakness in the ends of the ring.

The construction as above described can be easily manufactured, easily installed and has many commercial advantages. Among these advantages are First, that the expander is merely a ribbon of steel cut to the proper length. If desired, this ribbon may be bent to a substantially circular form, but such pre-bending is not necessary for a flat ribbon may be readily engaged with the piston ring.

Second, the same expander is used with the ring for all depths of ring grooves, thereby dispensing with the necessity of holding in stock a large number of expanders for alternative use with the same ring. This as above stated is due to the fact that the expander does not contact with the bottom of the ring groove but develops its pressure by its inherent tendency to assume a true circular form.

Third, as only the thickness of the expander is added to the radial depth of the ring, this construction is capable of being installed in ring grooves of minimum depth.

Fourth, by increasing the number of points of bearing of the ring against the expander, the same pressure may be developed with a thinner ribbon.

Fifth, the humps or bearings of the ring may if desired be formed in the original casting, requiring little if any machining.

Sixth, in performance this combination of ring and expander is much more lively than a ring and corrugated ribbon expander which bears against the bottom of the ring groove. In other words, frictional losses during expansion and contraction are less than with a corrugated ring so that the unit pressure against the oil film is more nearly uniform during expansion and contraction of the ring.

Seventh, the oil groove in the outer surface of the ring maintains a constant supply of lubricant which travels with the ring in contact with the cylinder wall. Also, by reducing the area of peripheral contact the unit pressure is increased and this forms a ready means of obtaining a predetermined unit pressure by varying the width of the groove with respect to the width of the ring. At the same time, the presence of the lubricant in the groove maintains a sufficient lubrication of the cylinder wall to avoid rapid wear of the restricted area of contact.

What I claim as my invention is:

1. The combination with a member having a peripheral ring groove therein, of a trans-split annular expander in said groove, a ring in said groove surrounding said expander, circumferentially distributed radially extending bearings between said ring and expander forming pockets therebetween, and means for holding the ends of the expander in fixed relation to each other under all working conditions to cause the expander to distort and bow outwardly into said pockets, and whereby the ends of the expander will be readily disengageable from said means upon application of lateral pressure thereto when the ring and expander are removed from the groove.

2. The combination with a member having a peripheral ring groove therein, of a trans-split annular expander in said groove, a ring in said groove surrounding said expander and provided with a circumferentially extending oil groove in its peripheral face, leaving bearing portions of restricted width above and below said groove, circumferentially distributed radially extending bearings between said ring and expander forming pockets therebetween, and means for holding the ends of the expander in fixed relation to each other under all working conditions to cause the expander to distort and bow outwardly into said pockets, and whereby the ends of the expander will be readily disengaged from said means upon application of lateral pressure thereto when the ring and expander are removed from the groove.

3. In combination with a member having a peripheral ring groove therein, of a trans-split annular expander in said groove, a ring in said groove surrounding said expander, circumferentially distributed radially extending bearings between said ring and expander forming pockets therebetween, and means for holding the ends of the expander in fixed relation to each other under all working conditions to cause the expander to distort and bow outwardly into said pockets, and whereby the ends of the expander will be readily disengaged from said means upon application of lateral pressure thereto when the ring and expander are removed from the groove, the relatively fixed ends of said expander being arranged non-coincident with the split in the ring, whereby the radially outward pressure of the expander adjacent said split is no less than that on other parts of the ring.

4. In combination with a member having a peripheral ring groove therein, of a trans-split annular expander in said groove, a ring in said groove surrounding said expander, circumferentially distributed radially extending bearings between said ring and expander forming pockets therebetween, and means for holding the ends of the expander in fixed relation to each other under all working conditions to cause the expander to distort and bow outwardly into said pockets, and whereby the ends of the expander will be readily disengaged from said means upon application of lateral pressure thereto when the ring and expander are removed from the groove, the relatively fixed ends of said expander being located at a point diametrically opposite from the split in the ring whereby the maximum radially outward pressure of the expander is adjacent said split in the ring.

5. The combination with a member having a peripheral ring groove therein, of a trans-split annular expander in said groove, a ring in said groove surrounding said expander, circumferentially distributed radially extending bearings between said ring and expander forming pockets therebetween and including bearings adjacent each end of the expander on opposite sides of the split, and means for holding the ends of the expander in fixed relation to each other under all working conditions to cause the expander to distort and bow outwardly into said pockets, and whereby the ends of the expander will readily disengage from said means on application of lateral pressure thereto when the ring and expander are removed from the groove, the relatively fixed ends of said expander being arranged at a point on the opposite side from the split in the ring, and the portions of said expander adjacent the radially extending bearings at the ends of the ring being more deeply bowed.

6. The combination with a member having a peripheral ring groove therein, of a trans-split annular expander in said groove, a ring in said groove surrounding said expander and provided with a series of radially inwardly extending lugs or bearings with pockets intermediate the same, and means for holding the ends of the expander in fixed relation to each other under all working conditions to cause the expander to distort and bow outwardly into said pockets whereby the ends of the expander will be readily disengaged from said means upon application of lateral pressure thereto when the ring and expander are removed from the groove.

7. The combination with a member having a peripheral ring groove therein, of a trans-split annular expander in said groove, a ring in said groove surrounding said expander provided with a series of circumferentially distributed radially inwardly extending lugs or bearings with pockets therebetween and including a lug against the opposite sides of which the ends of said expander abut, whereby said ends of the expander are held in fixed relation to each other under all working conditions to cause the expander to distort and bow outwardly into said pockets, and also whereby the ends of the expander will be readily disengaged from said lug upon application of lateral pressure thereto when the ring and expander are removed from the groove.

8. The combination with a cylinder and a member therein having a peripheral ring groove, of a trans-split annular expander in said groove, a trans-split ring in said groove having a series of circumferentially distributed radially inwardly extending lugs or bearings with pockets therebetween, and including a lug with the opposite faces of which the ends of said expander are engaged to hold said ends in fixed relation to each other under all working conditions, said ring being of a normal diameter approximately equal to that of the cylinder so as to have negligible inherent outward tension whereby the contraction of said ring into the ring groove will cause the expander to bow outwardly into said pockets and place an outward tension on the ring, said expander being readily disengageable from the ring upon application of lateral pressure thereto when the ring and expander are removed from the groove.

9. The combination with a member having a peripheral ring groove therein, of a trans-split annular expander in said groove, a trans-split ring in said groove surrounding said expander and provided with radially inwardly extending lugs or bearings forming pockets therebetween, and including a lug the opposite faces of which are engaged by the ends of the expander to hold said ends in fixed relation to each other under all working conditions to cause the expander to bow outwardly into said pockets, and an anchor pin for said expander engaging a recess in the wall of said groove to hold said expander from rotation whereby the engagement of the ends of said expander with said lug will hold the ring also from rotation in the groove.

10. The combination with a member having a peripheral ring groove therein, of a trans-split annular expander in said groove, a trans-split ring in said groove surrounding said expander and provided with radially inwardly extending lugs or bearings forming pockets therebetween, and including a lug the opposite faces of which are engaged by the ends of the expander to hold said ends in fixed relation to each other under all working conditions to cause the expander to bow outwardly into said pockets, and an anchor pin riveted to said expander and extending radially inward to engage a recess in the wall of said groove, said pin being located adjacent to the split in said ring, and the ends of the ring adjacent to the split being cut away to clear the rivet head of the pin.

11. The combination with a member having a peripheral ring groove therein, of a trans-split annular expander in said groove, a ring in said groove surrounding said expander and provided with a series of circumferentially distributed radially inwardly extending bearings forming pockets therebetween, and including a lug having the opposite faces thereof engaged by the ends of the expander to hold the latter in fixed relation to each other under all working conditions to cause the expander to distort and bow outwardly into said pockets, said expander being normally in the form of a circular arc with the end portions thereof which engage said lug formed of a curve of greater radius whereby said ends are held from disengagement from said lug upon the bow of said expander.

12. The combination with a member having a peripheral ring groove therein, of a trans-split annular expander in said groove, a ring in said groove surrounding said expander provided with circumferentially distributed radially inwardly extending lugs or bearings forming pockets therebetween, and enlargements at the ends of said expander forming abutments for each other and for holding the same in fixed relation under all working conditions to cause the expander to distort and bow outwardly into said pockets whereby the ends of the expander will be readily disengaged from the ring upon the application of lateral pressure thereto when the ring and expander are removed from the groove.

In testimony whereof I affix my signature.
NORMAN T. HARRINGTON.